(12) United States Patent
Kammann

(10) Patent No.: US 8,626,413 B2
(45) Date of Patent: Jan. 7, 2014

(54) TIRE MODULE AND METHOD FOR SENSING WHEEL STATE VARIABLES AND/OR TIRE STATE VARIABLES

(75) Inventor: Stefan Kammann, Kelkheim (DE)

(73) Assignee: Continental Teves AG & Co. oHG (DE)

( * ) Notice: Subject to any disclaimer, the term of this patent is extended or adjusted under 35 U.S.C. 154(b) by 915 days.

(21) Appl. No.: 12/301,635

(22) PCT Filed: May 10, 2007

(86) PCT No.: PCT/EP2007/054524
§ 371 (c)(1),
(2), (4) Date: Jul. 29, 2009

(87) PCT Pub. No.: WO2007/134975
PCT Pub. Date: Nov. 29, 2007

(65) Prior Publication Data
US 2009/0299570 A1    Dec. 3, 2009

(30) Foreign Application Priority Data

May 22, 2006  (DE) .......................... 10 2006 024 156
Sep. 12, 2006 (DE) .......................... 10 2006 043 505

(51) Int. Cl.
*G06F 7/00*   (2006.01)
*G06F 17/00*  (2006.01)
*G06F 19/00*  (2011.01)

(52) U.S. Cl.
USPC ............... 701/69; 340/442; 146/34 R; 73/146

(58) Field of Classification Search
USPC ................ 340/442–447; 146/34 R; 73/146.5, 73/146.2–146; 701/69
See application file for complete search history.

(56) References Cited

U.S. PATENT DOCUMENTS

| | | | |
|---|---|---|---|
| 4,855,544 A |   | 8/1989 | Glenn |
| 5,488,557 A | * | 1/1996 | Matsuda ........................ 701/75 |
| 5,783,992 A | * | 7/1998 | Eberwine et al. ............. 340/445 |
| 5,915,488 A | * | 6/1999 | Fliege ........................ 180/65.22 |
| 5,946,605 A | * | 8/1999 | Takahisa et al. ................ 455/68 |

(Continued)

FOREIGN PATENT DOCUMENTS

| | | | |
|---|---|---|---|
| CN | 101590790 B | * | 4/2011 |
| DE | 698 04 098 T2 |   | 10/2002 |

(Continued)

OTHER PUBLICATIONS

Acceleration of Dielectric Charging in RF MEMS Capacitive Switches; Xiaobin Yuan; Zhen Peng; Hwang, J.C.M.; Forehand, D.; Goldsmith, C.L.; Device and Materials Reliability, IEEE Transactions on; vol. 6, Issue: 4 ; Digital Object Identifier: 10.1109/TDMR.2006.887417; Publication Year: 2006 , pp. 556-563.*

(Continued)

*Primary Examiner* — Cuong H Nguyen
(74) *Attorney, Agent, or Firm* — RatnerPrestia

(57) ABSTRACT

A tire module for sensing wheel and/or tire state variables is provided. The module includes at least one acceleration switch which determines a wheel state variable and/or a tire state variable. A method for sensing wheel state variables and/or tire state variables is also provided. In the method, a characteristic variable which is a measure of the length of the contact area of the tire or the contact area run-through time is determined by an acceleration switch.

21 Claims, 6 Drawing Sheets

(56) References Cited

U.S. PATENT DOCUMENTS

| | | | |
|---|---|---|---|
| 6,259,361 B1* | 7/2001 | Robillard et al. | 340/447 |
| 6,538,566 B1 | 3/2003 | Morand | |
| 6,741,170 B2* | 5/2004 | Alrabady | 340/438 |
| 6,823,728 B1* | 11/2004 | Barnes | 73/146 |
| 6,906,436 B2 | 6/2005 | Jenson et al. | 307/116 |
| 7,089,099 B2* | 8/2006 | Shostak et al. | 701/29.6 |
| 7,103,460 B1* | 9/2006 | Breed | 701/32.9 |
| 7,164,117 B2* | 1/2007 | Breed et al. | 250/221 |
| 7,180,019 B1* | 2/2007 | Chiou et al. | 200/61.45 R |
| 7,274,118 B2* | 9/2007 | Jenson et al. | 307/116 |
| 7,313,467 B2* | 12/2007 | Breed et al. | 701/1 |
| 7,379,800 B2* | 5/2008 | Breed | 701/33.7 |
| 7,408,453 B2* | 8/2008 | Breed | 340/442 |
| 7,663,502 B2* | 2/2010 | Breed | 340/12.25 |
| 2003/0128128 A1* | 7/2003 | Alrabady | 340/672 |
| 2004/0131925 A1* | 7/2004 | Jenson et al. | 429/61 |
| 2005/0046584 A1* | 3/2005 | Breed | 340/825.72 |
| 2005/0080543 A1* | 4/2005 | Lu et al. | 701/70 |
| 2005/0145025 A1 | 7/2005 | Fischer et al. | |
| 2005/0192727 A1* | 9/2005 | Shostak et al. | 701/37 |
| 2005/0218726 A1* | 10/2005 | Jenson et al. | 307/116 |
| 2006/0001534 A1* | 1/2006 | Shida et al. | 340/445 |
| 2006/0025897 A1* | 2/2006 | Shostak et al. | 701/1 |
| 2006/0180371 A1* | 8/2006 | Breed et al. | 180/197 |
| 2006/0208169 A1* | 9/2006 | Breed et al. | 250/221 |
| 2006/0212193 A1* | 9/2006 | Breed | 701/29 |
| 2007/0107505 A1 | 5/2007 | Schillinger et al. | |
| 2007/0260376 A1* | 11/2007 | Hattori | 701/36 |

FOREIGN PATENT DOCUMENTS

| | | |
|---|---|---|
| DE | 10 2004 001 250 B4 | 8/2005 |
| EP | 09 24 129 A1 | 6/1999 |
| EP | 1 596 407 A | 11/2005 |
| EP | 1596407 A1 * | 11/2005 |
| JP | 3-139436 * | 5/1991 |
| JP | 11011131 A * | 1/1999 |
| JP | 2004-196401 * | 7/2004 |
| JP | 2005327711 A * | 11/2005 |
| WO | 2004/056591 A | 7/2004 |
| WO | WO 2005/056311 A2 | 6/2005 |

OTHER PUBLICATIONS

Sensing of multiple unrelated tire parameters using electrically open circuit sensors having no electrical connections Chuantong Wang; Woodard, S.E.; Taylor, B.D.; Sensors Applications Symposium, 2009. SAS 2009. IEEE Digital Object Identifier: 10.1109/SAS.2009. 4801795; Publication Year: 2009 , pp. 142-147.*

Virtual Sensors and Their Automotive Applications; Prokhorov, D.; Intelligent Sensors, Sensor Networks and Information Processing Conference, 2005. Proceedings of the 2005 International Conference on; Digital Object Identifier: 10.1109/ISSNIP.2005.1595614; Publication Year: 2005 , pp. 411-416.*

On the performance increase of wheel deceleration control through force sensing; de Bruijn, E.; Gerard, M.; Corno, M.; Verhaegen, M.; Holweg, E.; Control Applications (CCA), 2010 IEEE International Conference on; Digital Object Identifier: 10.1109/CCA.2010. 5611223; Publication Year: 2010 , pp. 161-166.*

The "intelligent tire" utilizing passive SAW sensors measurement of tire friction; Pohl, A.; Steindl et al.,Instrumentation and Measurement, IEEE Trans. on; vol. 48 , Issue: 6; Digital Object Identifier: 10.1109/19.816111; Publication Year: 1999 , pp. 1041-1046.*

On road tire deformation measurement system using a capacitive-resistive sensor; Sergio, M. et al.; Sensors, 2003. Proc. of IEEE vol. 2; Year: 2003 , pp. 1059-1063 vol. 2.*

Symmetrical Wheatstone Microcantilever Sensor with On-chip Temperature Sensors; Tuantranont, A. et al., Sensors, 2006. 5th IEEE Conf. on; Digital Object Id: 10.1109/ICSENS.2007.355579; Pub Year: 2006 , pp. 757-760; IEEE Conf. Pub.*

Ti-Ni SMA film actuated Si cantilever beams for MEMS probe card; Namazu, T. et al., Solid-State Sensors, Actuators and Microsystems, 2005. Digest of Technical Papers. Transducers '05. The 13th Inter. Conf.on, vol. 1; Digital Object Id. 10.1109/SENSOR.2005.1496521; Pub. Yr: 2005 , pp. 733-736 vol. 1.*

Critical Issues in Fabrication of RF MEMS Switches; Zheng Cui; MEMS Sensors and Actuators, 2006. The Institution of Engineering and Technology Seminar on; Pub Yr: 2006 , pp. 163-168.*

Transducers '05. The 13th Inter. Conf. On Solid-State Sensors, Actuators and Microsystems. Digest of Technical Papers (IEEE Cat. No. 05TH8791);Solid-State Sensors, Actuators and Microsystems, 2005. Digest of Technical Papers. Transducers '05. The 13th Inter. Conf. on; vol. 2; Digital Object Id: 10.1109/SENSOR.2005. 1497256; Pub. Yr. 2005.*

Understanding tire/road stick-slip interactions with embedded rubber force sensors; Yizhai Zhang ; Allen, A.W. ; Jingang Yi ; Tao Liu Advanced Intelligent Mechatronics (AIM), 2012 IEEE/ASME International Conference on; Digital Object Identifier: 10.1109/AIM. 2012.6265935; Publication Year: 2012 , pp. 550-555.*

* cited by examiner

TIRE MODULE AND METHOD FOR SENSING WHEEL STATE VARIABLES AND/OR TIRE STATE VARIABLES

CROSS REFERENCE TO RELATED APPLICATIONS

This application is the U.S. national phase application of PCT International Application No. PCT/EP2007/054524, filed May 10, 2007, which claims priority to German Patent Application No. DE 102006024156.8, filed May 22, 2006 and German Patent Application No. DE 102006043505.2, filed Sep. 12, 2006, the content of such applications being incorporated by reference herein in their entirety.

BACKGROUND OF THE INVENTION

1. Field of the Invention

The invention relates to a tire module for sensing wheel state variables and/or tire state variables and to a method for sensing wheel state variables and/or tire state variables.

2. Description of the Related Art

In modern motor vehicles, tire air pressure-monitoring systems are being increasingly used to avoid defects or accidents which are due to incorrect air pressure in the tires. These conventional systems usually include direct or indirect sensing of the air pressure.

However, in particular for the safety and the durability of a tire it is not the air pressure in the tire which is decisive but rather the length of the tire contact area (also referred to as the tire contact length). The (central) tire contact length of a tire is a decisive variable for the state of the tire or of the wheel.

WO 2005/056311 A2 discloses a sensor transponder and a method for measuring the length of the tire contact area and the wheel load. In one embodiment, the transponder, which comprises an acceleration sensor, is attached to the inside of a tire, opposite the tire tread. The acceleration can be measured according to a capacitive, piezoresistive, ferroelectric, electrodynamic or else piezoelectric principle. The time profile of the acceleration is sensed by means of the acceleration sensor and evaluated in a complex fashion in order to obtain the tire contact length.

SUMMARY OF THE INVENTION

Taking this prior art as a starting point, the invention relates to an improved tire module for sensing wheel state variables and/or tire state variables which is easy and cost-effective to manufacture and which does not require complex evaluation of measured data.

The invention relates to the idea that the tire module comprises an acceleration switch which is used to sense wheel state variables and/or tire state variables. The acceleration switch is preferably arranged on an inner side of the tire tread. The tire module is particularly preferably arranged on an inner side of the tire tread.

"Acceleration switch" is, in a generalization, understood to be a switch which can assume two or more discrete states (limiting value switch) as a function of the acceleration. In the simplest case, these are the two states "open" and "closed" in a closing contact switch ("normal state" is open) or opening contact switch ("normal state" is closed). However, the switch can also function as a changeover switch, i.e. it switches between two or more contact positions; the corresponding states are then, for example, "contact 1 closed, contact 2 open" and "contact 1 open, contact 2 closed". Correspondingly, two or more different signals can also be output at the output of the switch.

Particularly preferably, a characteristic variable which, is a measure of the length of the tire contact area or the time required to pass through the contact area or is a variable which is dependent on these variables, is determined using the acceleration switch. It is therefore possible to monitor, and if appropriate give a warning of, the state of the tire or of the wheel.

According to one preferred embodiment of tire module, the tire module also comprises at least one further electronic component, such as a sensor, an electronic evaluation system, a transmitting and/or receiving device, a memory, an energy converter which uses a change in acceleration or a deformation in order to acquire electrical energy, or a battery. The sensor is particularly preferably a pressure sensor for directly monitoring the tire pressure.

In one development of the tire module according to aspects of the invention, the tire module comprises a circuit with which the tire module and/or individual electronic components are controlled by the acceleration switch. Particularly preferably, the switching on or activation of the tire module and/or of individual electronic components is controlled here by the acceleration switch. As a result, it possible that the tire module is not activated by means of the acceleration switch until, for example, the wheel has reached a predefined velocity. This can reduce the loading on a battery for supplying the tire module when the tire is stationary or travelling slowly.

The acceleration switch preferably has one or more switching thresholds. These can particularly preferably be selected and/or set by means of a controller. This permits the acceleration switch to be adapted to different requirements or conditions such as, for example, the velocity.

It is also preferred that the acceleration switch is embodied in such a way that when a predefined velocity or acceleration is reached it switches from a first switched state into a second switched state and stays in this second switched state until it is reset into the first switched state using a control signal. This embodiment is particularly suitable for waking up the tire module.

However, it is also preferred that the acceleration switch is embodied in such a way that when a first predefined velocity or acceleration is reached it switches from a first switched state into a second switched state, and when a second predefined velocity or acceleration which is equal to or different from the first predefined velocity or acceleration is reached, it switches back from the second switched state into the first switched state. This embodiment is particularly suitable for determining the tire contact length.

In one development of the tire module according to aspects of the invention, said tire module comprises a plurality of acceleration switches which are mounted in a housing or on a substrate or on a printed circuit board. The acceleration switches are particularly preferably embodied here as an MEMS arrangement. A plurality of functionalities accompanied by the most compact design possible are therefore achieved.

The individual acceleration switches are, at least to a certain extent, embodied in different ways in terms of design, size or orientation in the tire module and/or have different switching properties in order to perform different functions. Different switching properties are particularly preferred—different switching thresholds, identical or different switching thresholds for opening and closing (acceleration switch with or without a switching hysteresis) or an acceleration switch with or without self latching.

In this context, preferably at least two acceleration switches are embodied in such a way that they respectively determine in a different velocity range a characteristic variable which is a measure of the length of the tire contact area or the time required to pass through the contact area. As a result, reliable and precise determination of the tire contact length is achieved in different velocity ranges since the acceleration switches are respectively optimized for a velocity range.

At least one acceleration switch is preferably embodied in such a way that when a predefined velocity is reached it switches from a first switched state into a second switched state and stays in this second switched state until it is reset into the first switched state using a control signal. Such a switch with self latching is particularly preferably used to implement a wake-up function.

According to a further preferred embodiment, the tire module comprises at least one acceleration switch to activate or switch on the tire module and/or individual electronic components of the tire module (wake-up function).

Furthermore, the invention relates to a method for sensing wheel state variables and/or tire state variables, which method is easy and cost-effective to carry out and does not require complex evaluation of measured data.

The method relates to the idea that a characteristic variable, which is a measure of the length of the tire contact area or a variable which is associated with it, such as for example the time required to pass through the contact area, is determined using an acceleration switch.

In this context, the characteristic variable is preferably determined in different velocity ranges by means of an acceleration switch having more than one switching threshold or by means of at least two acceleration switches having different switching properties. Since the switching thresholds of an acceleration switch or the switching properties/thresholds of a plurality of different acceleration switches are respectively optimized for one velocity range, reliable and precise determination of the tire contact length in different velocity ranges is achieved.

According to one preferred embodiment of the invention, the tire module and/or individual electronic components of the tire module are controlled by means of at least one acceleration switch. In this context it is particularly preferred that the tire module and/or individual electronic components of the tire module are switched on or off. It is quite particularly preferred that the tire module is activated or switched on when the wheel reaches a predefined velocity, which is detected using an acceleration switch. This can reduce the loading on a battery for supplying the tire module when the tire is stationary or travelling slowly.

According to one development of the method, the characteristic variable which is acquired is used for at least one of the following methods: for acquisition of the position of the tire on the vehicle; for a load-dependent pressure warning; for rolling equalization, in particular by means of an electronic stability program (ESP); for detection of the wheel load and use of this information in other vehicle control systems; for early detection of rollover; for detection of lifting off of a wheel; or for detection of the center of gravity of the vehicle. The position of the tire is particularly preferably acquired in the case of cornering, braking or acceleration. The characteristic variable is particularly preferably used to detect the center of gravity of the vehicle in order, for example, to detect hazardous load states of the vehicle (heavy roof rack).

An advantage which is achieved with the invention is that complex evaluation of measured data is not necessary in order evaluate the acceleration switch which can only assume a limited number of discrete states. The measured data can be read directly into a microcontroller without previous analog/digital conversion.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

In the field of tire sensor systems (tire pressure monitoring systems) it is customary that (tire) modules which are usually located on the rim measure at least one of the variables comprising pressure, temperature or acceleration (in a unidimensional or multi-dimensional fashion) and usually transmit said variable to a control unit on the vehicle. In this context, a tire module can comprise various electronic elements or electronic components such as, for example, sensors, in particular a pressure sensor, electronic evaluation systems, transmitting and/or receiving devices for exchanging control signals and data signals, memories or energy sources for supplying the module/the components such as, for example, an energy converter which uses a change in acceleration in the tire or a deformation of the tire to acquire electrical energy, or a battery.

Figure 1:
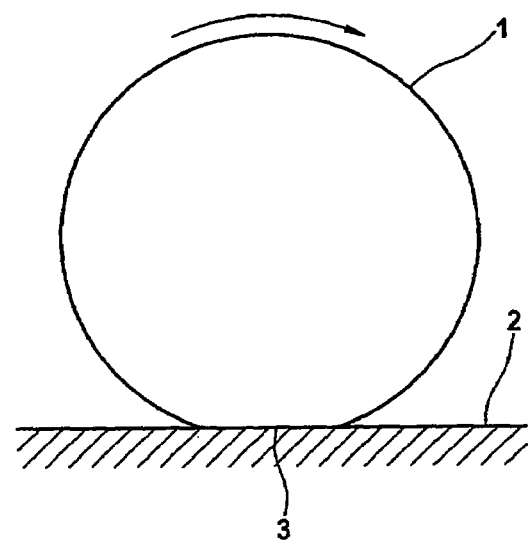
FIG. 1 is a schematic illustration of a rolling tire.

FIG. 1 is a schematic illustration of a tire 1, in particular of a motor vehicle or motor cycle, which rolls on an underlying surface 2. It is known that during the rolling process an area of flattened tire contact is produced, referred to as the tire contact area 3. The size (length and width) and the shape of the tire contact area 3 are dependent on tire characteristic data, the wheel load, the tire pressure, the driving state and the velocity.

It is also known to attach a tire module directly to the inner liner of the tire and to acquire there not only, for example, the pressure and/or temperature, but also the tire contact area 3 by means of an acceleration sensor, and to transmit it. In this context, the tire contact area 3 comprises only a small part of the circumference of the tire so that a sensor (and its evaluation or sampling) which is used to acquire the time required to pass through the contact area must have a resolution in the region of a few ms. Previously used acceleration sensors which function, for example, capacitively or piezoresistively supply an analog output value and require a comparison stage or a (very rapid) A/D converter (analog/digital converter) in order to detect and evaluate the tire contact length. This additional stage consumes energy, which is undesirable, and entails additional manufacturing costs.

Figure 2:
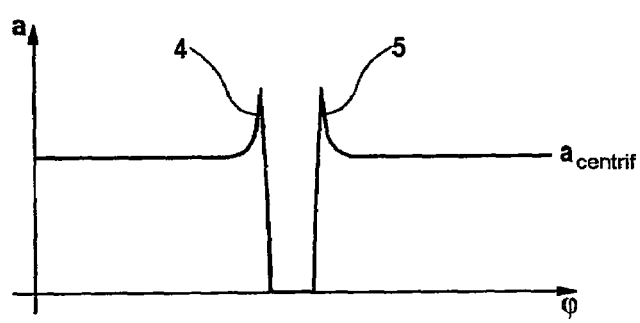
FIG. 2 is a schematic profile of an acceleration in a tire when the tire rolls.

The time required to pass through the contact area was previously determined, as mentioned above, using an acceleration sensor which is arranged in the tangential or radial direction of the tire. FIG. 2 shows an exemplary schematic profile of the acceleration a on the inner liner of the tire in the radial direction when the tire 1 rolls as a function of the circumferential angle $\phi$. Such a profile can be measured, for example, using a piezoelectric acceleration sensor. If the sensor is outside the tire contact area 3, it experiences the velocity-dependent and radius-dependent centrifugal acceleration $a_{centrif}$. Due to changes in acceleration which occur when the tire contact area is entered 4 and exited 5, for example, a seismic mass which is mounted so as to be capable of oscillating (test mass) is excited so as to oscillate. This movement energy is converted into electrical voltage by a piezoelectric element. The times between voltage peaks can be acquired through suitable, complex evaluation of the measured data. The time required to pass through the contact area can be determined from the time intervals.

The information and data required in this way, for example the time required to pass through the contact area, can then be transmitted, as a component of a transmission protocol, by the sensor which determines the variables or the (tire) module or an evaluation unit, for example from the tire, to the vehicle electronic system, for example a control unit of a tire monitoring system in the vehicle. The data can be processed here in the sensor or module or alternatively in the vehicle electronic system.

The tire contact length is decisive for the safety and the durability of a tire.

The measurement of the time required to pass through the contact area is carried out with a sensor system which does not require additional electrical energy and nevertheless makes available a digital output (single stage or multi-stage). This permits very simple evaluation which does not require intensive computing operations. The sensor system is in this case an acceleration switch which closes a contact when an acceleration a (which either can be set from the outside or permanently predefined) is acting. The acceleration switch can be constructed here either macroscopically or as an MEMS structure (microelectromechanical system). Acceleration-sensitive micro switches constitute a cost-effective micromechanically fabricated limiting value switch for acceleration. The acceleration switch does not require any analog evaluation and does not need an operating voltage.

The acceleration switch can be embodied in different forms. For example, embodiments with a bending beam, a diaphragm or a rolling ball are preferable, however other embodiments are also conceivable. A number of exemplary embodiments of acceleration switches with bending beams are described in the text which follows.

Figure 3:
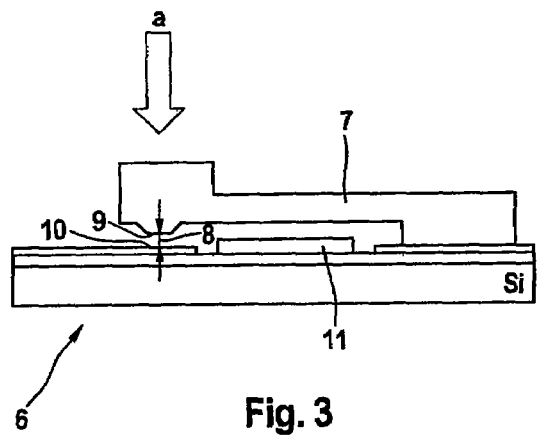
FIG. 3 shows a first embodiment of an exemplary acceleration switch.

FIG. 3 is a schematic illustration of a lateral section through a structure of an exemplary acceleration switch for use in a tire module. The acceleration switch 6 has a bending beam 7 on whose free end a contact pin 9 is arranged. The bending beam 7 is attached to a base element on which a contact pin 10 and buffer element 11, which limits the deflection of the bending beam 7 in the direction of the base element through contact, are arranged.

Acceleration a acts here on the bending beam 7. Through the inherent mass of the beam 7 and/or through an additionally attached mass, a force is applied to the bending beam 7 according to the Newtonian principle, and the said bending beam 7 is bent, and when a specific acceleration $a_s$ is exceeded the contact distance 8 between the contact pins 9, 10 becomes zero, and the contact between the contact pin 9 and contact pin 10 is closed. The output variable of the acceleration switch 6 is therefore a digital signal—the switch is closed when an acceleration a which is higher than a limiting acceleration $a_s$ is acting, and the switch is open when an acceleration a which is lower than the limiting acceleration $a_s$ is acting.

Figure 4:
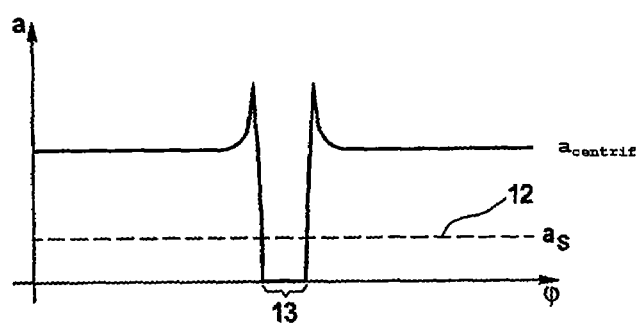
FIG. 4 shows a switching threshold of an exemplary acceleration switch.

FIG. 4 shows a possible switching threshold of an acceleration switch. If the (radial) acceleration a is above the switching threshold 12, the switch is closed. While the contact area is being passed through 13, the acceleration a on the tire module returns to gravitational acceleration which is below the switching threshold 12, and the switch opens. The acceleration a in the tire contact area is reduced to gravitational acceleration—independently of the velocity of the vehicle. The switch only functions at and above a specific velocity of the vehicle, and it does this when the centrifugal acceleration $a_{centrif}$ which depends on the velocity of the vehicle is higher than the switching threshold 12. If the centrifugal acceleration $a_{centrif}$ is below the switching threshold 12, the switch is continuously open.

Figure 5A:
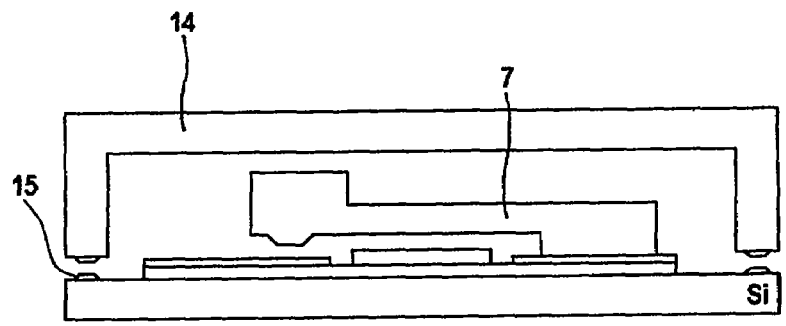
FIG. 5 shows a second embodiment of an exemplary acceleration switch.
Figure 5B:
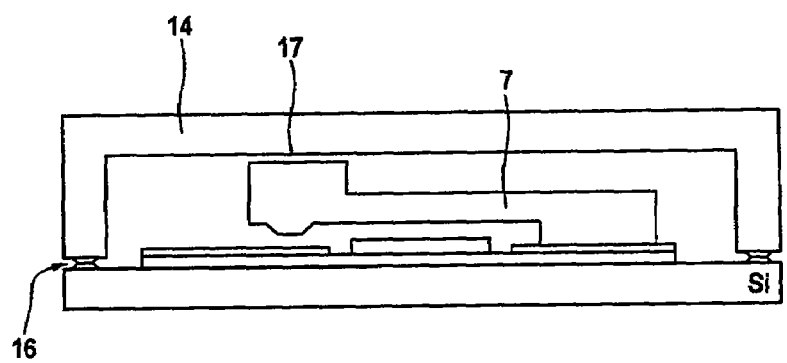

The acceleration switch can be hermetically encapsulated using a cover wafer (in the case of MEMS). This is illustrated, for example, in FIG. 5, in which the acceleration switch from FIG. 5 is illustrated, a hermetic encapsulation 16 of the acceleration switch with a cover wafer 14 being implemented by means of a bonding frame 15. If the distance between an upper stop 17 and the beam 7 is selected to be smaller than the contact distance 8, overshooting of the beam 7 (contact bounce) in the case of a pulse-shaped force effect (vibration, shock . . . ) is effectively suppressed since the (kinetic) energy which is stored in the oscillation of the beam 7 is reduced by the stop 17. A contact can also optionally be provided on the upper stop 17 so that detection of acceleration is implemented in two directions.

The quality of the oscillating system can also be set by means of the vacuum in the hermetic encapsulation—the lower the number of gas molecules within the encapsulation the higher the quality. This means conversely that with an over pressure in the interior it is possible to reduce the quality of the system and therefore dampen oscillation of the beam.

An acceleration switch with a cover can also be embodied as a changeover switch (exemplary embodiment which is not illustrated). For this purpose, in addition to a contact on the carrier layer (see reference number 10 in FIG. 3), for example, a further switching contact is provided on the cover or cover wafer. The bending beam correspondingly has both a contact pin in the lower region (see reference number 9 in FIG. 3) and a contact pin in the upper region, which can come into contact with the switching contact on the cover by bending the bending beam. The two contact pins on the bending beam are, for example, conductively connected. The contact on the cover is preferably closed normally, i.e. without acceleration acting. This is achieved, for example, by virtue of the fact that during assembly the cover is fitted on in such a way that as a result the bending beam is prestressed (pressed somewhat downward), so that the upper contact pin on the bending beam is in contact with the switching contact on the cover. When acceleration acts, the bending beam is forced downward, and the contact between the upper contact pin on the bending beam and switching contact on the cover opens, and the contact between the lower contact pin on the bending beam and switching contact on the bottom closes. The acceleration switch therefore switches between two positions.

Figure 6:
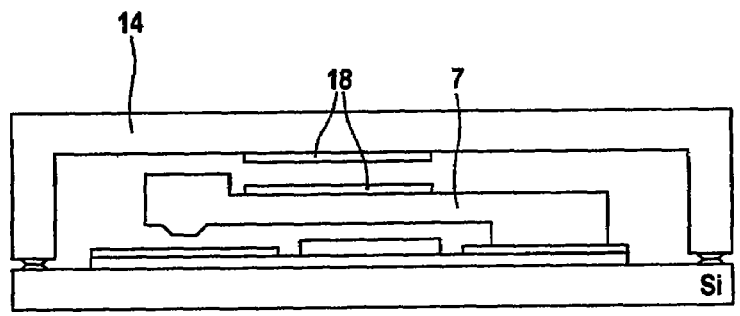
FIG. 6 shows a third embodiment of an exemplary acceleration switch.

A further example of an acceleration switch is illustrated in FIG. 6. The illustrated acceleration switch corresponds essentially to that illustrated in FIG. 3, and in this context said acceleration switch additionally comprises a cover 14 and two electrodes 18, which are arranged opposite one another on the bending beam 7 and on the cover 14. The bending beam 7 is prestressed by the electrostatic charge between the electrodes 14, counter to (or else in the same shape as) the force acting as a result of the acceleration a. In this way, the switching threshold 12 of the system is shifted. The electrodes 18, by means of which the electrostatic force is generated, can be shaped in any desired way (for example flat or comb structure).

Figure 7:
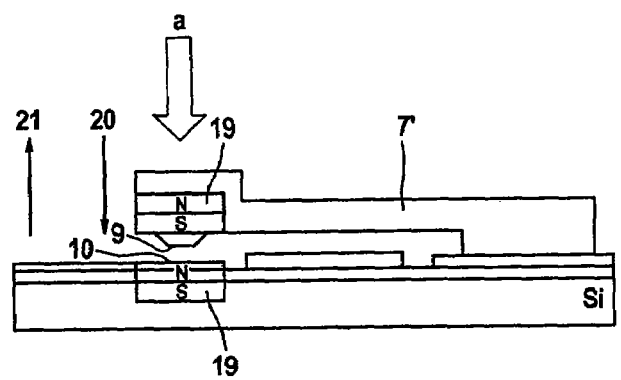
FIG. 7 shows a fourth embodiment of an exemplary acceleration switch.

In a further embodiment of the acceleration switch, said switch has a hysteresis. This means that the switch closes at a different acceleration level from the one at which it opens. For example, in the case of acceleration of 30 g the contact is closed, and it is only opened again at an acceleration of 10 g. This is advantageous in order to filter out noise or vibrations in the acceleration profile. This hysteresis can be implemented, for example, by means of permanent magnets 19 which are integrated in the switch and which are arranged at the free end of the bending beam 7' and opposite in the base element, as is illustrated in FIG. 7. The permanent magnets 19 generate a magnetic attraction 20 which counteracts the restoring force 21 of the beam 7'. The permanent magnets 19 therefore reinforce in a non-linear fashion the acceleration a which occurs. Furthermore, the permanent magnets 19 ensure reliable contact between the contact pins 9 and 10 (contact bounce is suppressed).

In order to save energy and therefore to be able to give a battery provided for supplying energy to the (tire) module small dimensions, it is appropriate to switch on the module only when driving. On the other hand, the module should, however, also function and transmit data during relatively short stops (for example at a traffic light or a gas station). This functionality is implemented by means of a switch with self latching, said switch switching on when a specific acceleration is exceeded and then remaining switched on without acceleration until the switch is actively reset. This means that the switch also retains its value (remains switched on) even while the contact area is being passed through 13. This switch can also be constructed either as a MEMS or macroscopically.

Figure 8:
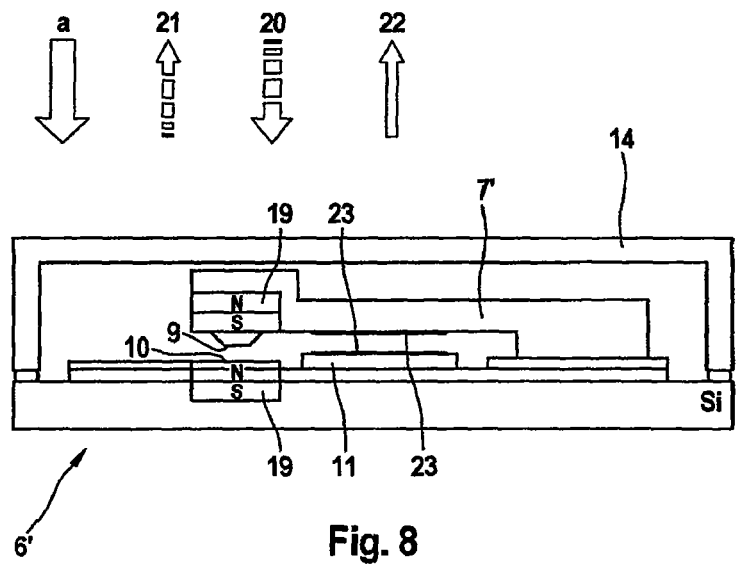
FIG. 8 shows a fifth embodiment of an exemplary acceleration switch.

The exemplary embodiment of an acceleration switch with self latching which is illustrated in FIG. 8 is similar to the exemplary embodiment of an acceleration switch which is illustrated in FIG. 7. However, the acceleration switch 6' which is illustrated in FIG. 8 also comprises two electrodes 23 which are arranged opposite one another on the bending beam 7' and on the buffer element 11.

The acceleration a acts on the seismic mass on the bending beam 7' (inherent mass of the beam 7' and/or an additionally attached mass). If a certain threshold acceleration $a_s$, which can be set/predefined, for example, by means of the dimensioning of size, is exceeded, the contacts 9, 10 of the switch 6' are closed. In this exemplary embodiment too, permanent magnets 19 generate a magnetic attraction 20 which counteracts the restoring force 21 of the beam 7'. The field strength of the magnets is selected here in such a way that the permanent magnets 19 ensure the self latching of the switch even if acceleration stops completely. According to the example, the contact is opened again by means of an electrostatic force 22. For this purpose, a voltage is applied to the electrostatic electrodes 23. The voltage can either have a repelling effect (same polarity at both electrodes) or, given a different geometric arrangement of electrodes, it can also have an attracting effect (opposed polarity at the two electrodes).

Figure 9:
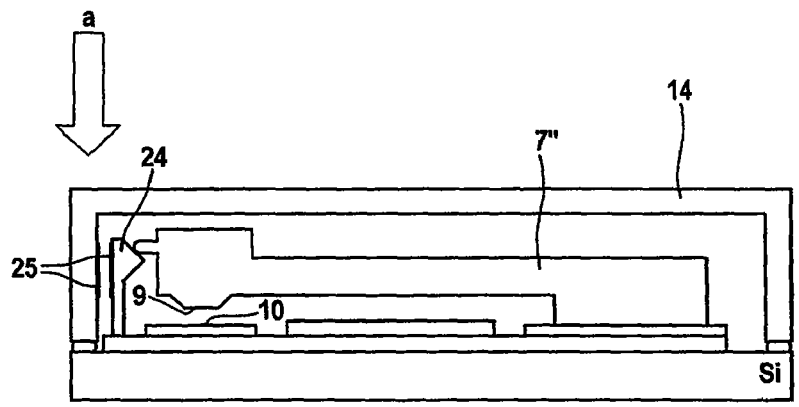
FIG. 9 shows a sixth embodiment of an exemplary acceleration switch.

A further exemplary embodiment of an acceleration switch with self latching is illustrated in FIG. 9. The exemplary embodiment corresponds essentially to the acceleration switch from FIG. 5; it is simply that this example also comprises a mechanical catch 24 which is arranged on the specially shaped free end of the bending beam 7", and two electrodes which are mounted opposite one another on the mechanical catch 24 and the cover 14.

According to this exemplary embodiment, the blocking of the switch is achieved by means of a mechanical catch 24. If the beam 7" is bent by an acceleration a, the mechanical catch 24 is bent back. The beam 7" clicks under the catch 24 and is therefore locked. The mechanical catch 24 is shaped in such a way that a force is continuously applied to the beam, and the contacts 9 and 10 of the switch therefore remain reliably closed. The switch can become released by virtue of the fact that the mechanical catch 24 is pulled back by an electrostatic force. Movement of the bending beam 7" is therefore released again. For this purpose, a corresponding voltage has to be applied to the electrostatic electrodes 25.

Further exemplary embodiments (not illustrated) of acceleration switches are also possible, for example with a membrane instead of a bending beam. Likewise, the locking means can have any conceivable mechanical or magnetic arrangement. The release of the locking means does not necessarily have to be carried out in an electrostatic fashion. Arrangements on the basis of electrodynamic, piezoelectric or other principles are also conceivable and can be applied. The switches can, as shown in the examples, be embodied as normally open switches or else as normally closed switches.

A further function of an acceleration switch in a tire module can be a wake-up function which is implemented, for example, by means of a wake-up circuit. In a (tire) module which is operated by means of a battery, a large part of the energy stored in the battery is consumed by leakage currents. These leakage currents flow through all the connected elements (capacitors, ICs (integrated circuits) etc.). The contact area sensor/acceleration switch (and possibly an electronic system which is connected thereto) cannot supply energy to the tire module and "wake it up" until the contact of the acceleration switch is closed, i.e. until the tire is rotating at a sufficiently large speed to close the switch (referred to as a rolling switch). This can generally be done appropriately only with a passive sensor system. In the text which follows, the computing unit of the connected tire module can activate a "self-preservation" facility of the tire module which continues to supply energy to the module for a specific time (running on). The running on is implemented, for example, with a field-effect transistor which bypasses the acceleration switch. In one exemplary embodiment, an acceleration switch therefore then performs the double function of measuring the contact area and switching on the module. In another exemplary embodiment, an acceleration switch performs the function of measuring the contact area, and a second acceleration switch performs the function of switching on the module.

The structure of an exemplary acceleration switch with a plurality of switching thresholds can be illustrated here in principle as in FIG. 3 or FIG. 7, but the acceleration switch does not have just one beam but rather a plurality of beams which are configured in different ways. Depending on the application, various (or a plurality of) beam contacts can be used. Depending on the velocity range or acceleration range, the most suitable switching threshold in an acceleration switch with a plurality of switching thresholds can be selected.

However, it is also preferred for a plurality of acceleration switches to be mounted in one housing. The various acceleration switches can be dimensioned differently here and have different switching properties (hysteresis, switching threshold, self latching). The switches can also be arranged in different positions so that they respond to accelerations from different axes and angles.

In a MEMS (microelectromechanical system), a plurality of structures (switches etc.) can be readily provided in one silicon die (silicon chip). The invention therefore also comprises the combination of more than one acceleration switch on one die (semiconductor chip).

Figure 10:
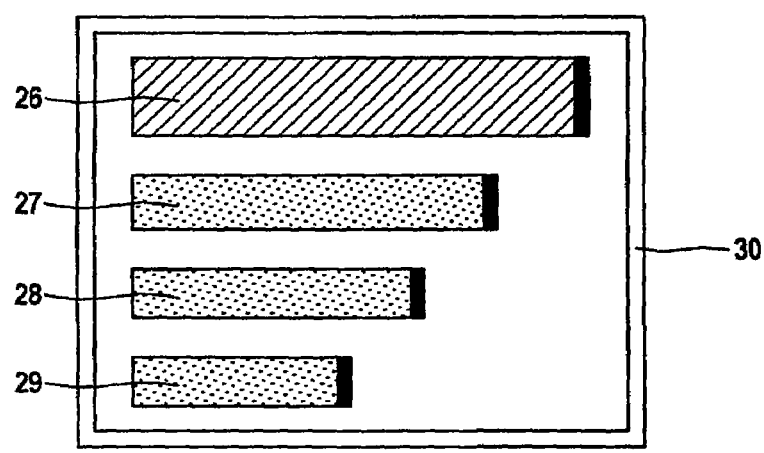
FIG. 10 shows an exemplary embodiment of a combination of acceleration switches in a housing.

A combination of a plurality of switches 26, 27, 28, 29 in a housing 30 is illustrated by way of example in FIG. 10. The switch 26 is an acceleration switch with self latching, and the acceleration switches 27, 28 and 29 have a different geometric structure and therefore different switching thresholds.

The switch with self latching 26 supplies, as already described above, the voltage to the tire module. The further acceleration switches 27, 28, 29 determine the contact length tire. The switches are configured for different acceleration values are read out only in specific velocity ranges (switch 27 for low velocities, switch 28 for medium velocities, switch 29 for high velocities). For example, at low velocities a switch 27 is used which already switches at low acceleration values and has a low resonance frequency. In order to ensure a high resolution at high velocities, a switch 29 which has a high resonance frequency is used at such velocities. Owing to the large acceleration forces at high velocities, there is no need for a high level of sensitivity of the switch. Generally, the switches can be constructed as normally open switches or normally closed switches or changeover switches.

The acquired contact length tire or the acquired time which is required to pass through the contact area can be used for one or more of the following system functions:

Assignment of the tire modules to the individual positions (auto-location) by "dynamic axial load distribution". Wheel loads which correspond to the vehicle dynamics occur, and correspondingly different tire contact lengths also occur, depending on the driving situation. In the case of a right hand bend, for example, dynamic loading of the left hand wheels (on the outside of the bend) occurs. The contact area on the left hand side therefore becomes longer and the contact area on the right hand side becomes shorter. When, for example, braking occurs, the contact are at the front becomes larger. Therefore, in the case of cornering or in the case of accelerations or braking, different tire contact lengths occur, and these can be detected and utilized.

Load-dependent pressure warning becomes possible (the tire contact length becomes larger due to more weight and this means that more pressure is necessary in the tire). Tire manufacturers recommend that different air pressures should be set depending on the load. The division hitherto into two or three stages (empty, partially laden, fully laden) is usually implemented. Here, an intelligent model can be applied which, for example, additionally takes into account the distance traveled or the velocity of the vehicle (a pressure warning is given when there is a high load and the air pressure is not sufficient for said load, for example only after a specific distance or at or above a specific velocity).

Rolling movements can be detected and suppressed by communication with the ESP control unit (electronic stability program). If a vehicle rolls, the dynamic wheel loads change. This can be detected by measuring the tire contact length and can be used for other systems.

The individual wheel loads can be detected and used by other systems of the vehicle, for example for automatic adjustment of the beam width, as a result of which sensors which were previously necessary for this can be dispensed with. If the properties of a tire are known, the tire contact length and the tire pressure can be used to determine the wheel load. The wheel loads can, for example, also be used to optimize the brake system (EBFD—electronic braking force distribution).

Furthermore, the spring damper effects of modern chassis can be set. Given known wheel loads, the chassis can be adapted to the conditions, which means more comfort and safety for the driver. Likewise, the steering can react to the individual wheel loads (or the load state of the vehicle). The comfort and handling of laden vehicle can therefore be improved.

Uneven underlying surfaces can be detected and used by other systems of the vehicle (for example chassis or brakes).

Early detection of aquaplaning (or driving on slush etc.) is made possible—aquaplaning of a wheel is detected. Vehicle systems can react to this and perform open-loop/closed-loop control.

Use of the tire contact length signal for early detection and avoidance of rollover (rollover protection) since imminent lifting off of one or more of the wheels is detected.

Detection of lifting off (or imminent lifting off) of a vehicle wheel from the carriageway.

Detection of the spatial center of gravity of the vehicle (detection of the center of gravity) using the dynamic change in the contact area when cornering and/or accelerating and/or decelerating.

If appropriate, the information relating to the time required to pass through the contact area/tire contact length can be supplemented by or combined with information about the tire pressure which is determined, for example, with a pressure sensor, and the said combined information can then be used for one of the applications described above.

Likewise, the information relating to the time required to pass through the contact area/tire contact length can be used for checking/plausibility checking of an air pressure sensor or of a measured pressure value. Hitherto, the plausibility of the pressure value of a pressure sensor could only be tracked with difficulty. If the tire contact length is also available as a second information item, a pressure sensor with "stuck" value or a pressure sensor which acquires a completely incorrect value can be determined better.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for sensing wheel state variables, tire state variables or both wheel state variable and tire state variables, wherein a characteristic variable, which is a measure of a length of a tire contact area or a time required to pass through the contact area, is determined using an acceleration switch comprising a base element, a cantilevered beam extending above the base element, a first contact provided on the base element, and a second contact provided on the cantilevered beam a predetermined distance above the first contact, wherein when the acceleration switch experiences a predetermined acceleration, the cantilevered beam bends such that the second contact touches the first contact.

2. The method as claimed in claim 1, wherein the characteristic variable is determined in different velocity ranges by means of an acceleration switch having more than one switching threshold or by means of at least two acceleration switches having different switching properties.

3. The method as claimed in claim 2, wherein the at least two acceleration switches having different switching thresholds.

4. The method as claimed in claim 1, wherein the tire module, individual electronic components of the tire module or both the tire module and individual electronic components, are controlled by means of at least one acceleration switch.

5. The method as claimed in claim 1, wherein the characteristic variable is used for at least one of the following steps:
   acquisition of a position of the tire of a vehicle,
   load-dependent pressure warning,
   rolling equalization,
   detection of a wheel load and use of the wheel load information in other vehicle control systems,
   early detection of rollover,
   detection of lifting off of a wheel, or
   detection of a center of gravity of the vehicle.

6. The method as claimed in claim 5, wherein the characteristic variable is used for acquiring the position of the tire of the vehicle, and wherein the position of the tire of the vehicle is acquired during cornering, braking or acceleration of the vehicle.

7. The method as claimed in claim 5, wherein the characteristic variable is used for rolling equalization, and wherein the rolling equalization step is performed by an electronic stability program (ESP).

8. The method as claimed in claim 5, wherein the characteristic variable is used for the detection of the wheel load and use of the wheel load information in the other vehicle control system, and wherein said other vehicle control system is a system for adjusting a beam width.

9. A tire module comprising at least one acceleration switch, the acceleration switch usable to determine a length of a tire contact area or a time required to pass through the contact area, the acceleration switch comprising a base element, a cantilevered beam extending above the base element, a first contact provided on the base element, and a second contact provided on the cantilevered beam a predetermined distance above the first contact, wherein when the acceleration switch experiences a predetermined acceleration, the cantilevered beam bends such that the second contact touches the first contact.

10. The tire module as claimed in claim 9, wherein said tire module comprises a plurality of acceleration switches which are mounted in a housing, on a substrate or on a printed circuit board.

11. The tire module as claimed in claim 10, wherein each acceleration switch is embodied as a MEMS arrangement.

12. The tire module as claimed in claim 10, wherein the individual acceleration switches are different.

13. The tire module as claimed in claim 12, wherein the individual acceleration switches have a different design, a different size, a different orientation in the tire module, different switching properties in order to perform different functions, or any combination thereof.

14. The tire module as claimed in claim 12, wherein at least two acceleration switches respectively determine, in a different velocity range, a characteristic variable which is a measure of a length of a tire contact area or a time required to pass through the contact area.

15. The tire module as claimed in claim 10, wherein at least one acceleration switch is embodied in such a way that when a predefined velocity is reached the at least one acceleration switch switches from a first switched state to a second switched state and stays in the second switched state until the at least one acceleration switch is reset into the first switched state using a control signal.

16. The tire module as claimed in claim 10, wherein at least one acceleration switch is used to activate the tire module, individual electronic components of the tire module, or both the tire module and the individual electronic components.

17. The tire module as claimed in claim 9, wherein said tire module further comprises: (i) at least one sensor, (ii) an electronic evaluation system, (iii) a memory, (iv) a battery or an energy converter which uses a change in acceleration or a deformation in order to acquire electrical energy, and (v) a transmitting device or a receiving device or both a transmitting device and a receiving device.

18. The tire module as claimed in claim 17, wherein the at least one sensor is a pressure sensor.

19. The tire module as claimed in claim 9, wherein said tire module comprises a circuit with which the tire module, individual electronic components or both the tire module and individual electronic components are controlled by the acceleration switch.

20. The tire module as claimed in claim 19, wherein activation of the tire module, individual electronic components or both the tire module and individual electronic components is controlled by the acceleration switch.

21. The tire module as claimed in claim 9, wherein the acceleration switch has one or more switching thresholds which can be selected by a controller, set by the controller or both selected and set by the controller.

* * * * *

UNITED STATES PATENT AND TRADEMARK OFFICE
CERTIFICATE OF CORRECTION

PATENT NO.       : 8,626,413 B2                                                                 Page 1 of 1
APPLICATION NO. : 12/301635
DATED            : January 7, 2014
INVENTOR(S)      : Stefan Kammann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1280 days.

Signed and Sealed this

Twenty-second Day of September, 2015

Michelle K. Lee
*Director of the United States Patent and Trademark Office*